United States Patent

[11] 3,566,155

[72] Inventors Samuel J. De Maio, Nutley; Arthur H. Magnus, Succasunna; James G. Dunn, Montclair; John Granlund, Short Hills, N.J.

[21] Appl. No. 739,737

[22] Filed June 25, 1968

[45] Patented Feb. 23, 1971

[73] Assignee International Telephone and Telegraph Corporation Nutley, N.J.

[54] BIT SYNCHRONIZATION SYSTEM
7 Claims, 6 Drawing Figs.

[52] U.S. Cl. .......... 307/232, 307/262, 307/269, 328/63, 328/133, 328/155

[51] Int. Cl. .......... H03k 5/20, H03k 9/08

[50] Field of Search .......... 307/232—234, 262, 269, 295; 328/109, 110, 133, 134, 63, 72, 155; 329/122; 331/23; 325/419

[56] References Cited

UNITED STATES PATENTS

| | | | |
|---|---|---|---|
| 3,080,487 | 3/1963 | Mellott et al. | 328/63X |
| 3,205,438 | 9/1965 | Buck | 328/133X |
| 3,238,462 | 3/1966 | Ballard et al. | 328/63 |
| 3,308,387 | 3/1967 | Hackett | 328/155 |
| 3,430,148 | 2/1969 | Miki | 307/232X |

*Primary Examiner*—Stanley D. Miller, Jr.
*Attorneys*—C. Cornell Remsen, Jr., Walter J. Baum, Percy P. Lantzy, Philip M. Bolton, Isidore Togut and Charles L. Johnson, Jr.

ABSTRACT: A flip-flop is coupled to a code signal source and a bit clock source. Logic and amplifier circuitry cooperate with the flip-flop to produce two oppositely varying width modulated pulses having opposite polarity. An integrating filter algebraically combines the width modulated pulses to produce a control signal proportional to the phase relationship between the bits of the code signal and the clock bits. The control signal adjusts a voltage control led oscillator in the bit clock source to establish synchronization between the bits of the two signals. The integrating filter has a first time constant enabling rapid synchronization and a second time constant to maintain the value of the control signal during long fades of the code signal.

INVENTORS
SAMUEL J. DE MAIO
ARTHUR H. MAGNUS
JAMES G. DUNN
JOHN GRANLUND
BY Alfred C. Hill
AGENT INVENTORS
SAMUEL J. DE MAIO
ARTHUR H. MAGNUS
BY JAMES G. DUNN
JOHN GRANLUND
Alfred C. Hill
AGENT INVENTORS
SAMUEL J. DE MAIO
ARTHUR H. MAGNUS
BY JAMES G. DUNN
JOHN GRANLUND
Alfred C. Hill
AGENT INVENTORS
SAMUEL J. DE MAIO
ARTHUR H. MAGNUS
JAMES G. DUNN
JOHN GRANLUND
BY Alfred C. Hill
AGENT

BIT SYNCHRONIZATION SYSTEM

BACKGROUND OF THE INVENTION

This invention relates to synchronization systems applicable to pulse code modulation (PCM) systems and more particularly to a bit synchronization system for PCM systems of the phase locked loop type.

Phase locked loop-type synchronization systems enabling the extraction of bit information from the received code signal and the adjustment of a local bit clock to cause synchronization has in the past employed a phase detector or comparator to which the received code signal and local bit clock signal are coupled for phase comparison. These phase detectors of the prior art generated directly an analogue control signal which then was applied to a low pass filter for limiting the bandwidth of the phase locked loop for control of a voltage controlled oscillator located in the bit clock signal source to cause synchronism of the bit clock to the received bits of the code signal. In the usual low pass filter there is a single time constant present which is made long to protect against code signal fading which increased the time of acquisition of synchronization. However, on the other hand if the time constant was adjusted for the rapid acquisition of synchronization there was no protection against fading of the code signal which would result in a loss of synchronization since the control signal would disappear from the control point of the voltage controlled oscillator.

SUMMARY OF THE INVENTION

An object of the present invention is to provide an improved synchronization system of the phase locked loop type.

Another object of this invention is to provide a synchronization system for a PCM system where the binary coded received signals establish the reference for the bit clock in the PCM receiver with the phase detector comparing these two bit signals being digital in nature.

Still another object of this invention is to provide a synchronization system for binary coded signals wherein the phase difference between the received code signal transitions and the local bit clock is converted in a digital phase detector to a pulse width modulation prior to integration to produce the control signal for the voltage controlled oscillator of the local bit clock source.

A further object of this invention is to provide a digital-type synchronization system to synchronize a local bit clock to the bits of the received coded data incorporating in combination a digital phase detector and an integration filter having a first time constant which enables rapid acquisition of synchronization between the two signals and a second time constant which will maintain the value of the control signal during long fades of the received code signal, such as experienced in tropospheric scatter, satellite and the like communication systems so that the oscillator will tend to remain at the frequency dictated by the control signal prior to the fading of the code signal below an acceptable signal threshold.

A feature of this invention is the provision of a system to generate an output signal proportional to the phase relationship of a first pulse signal and a second pulse signal comprising: a first source of the first pulse signal; a second source of the second pulse signal; first means coupled to the first and second sources to compare the phase relationship of the first and second pulse signals; second means coupled to the first means to produce a third pulse signal of one polarity having a first width variation dependent on the phase relationship of the first and second pulse signals; third means coupled to the first means to produce a fourth pulse signal of a polarity opposite to the one polarity having a second width variation dependent on the phase relationship of the first and second signals opposite the first width variation; and fourth means coupled to the second and third means responsive to the third and fourth pulse signals to provide the output signal.

Another feature of this invention is the provision of a system to synchronize a local bit clock signal to received bits of a binary code signal comprising: a first source of the code signal; a second source of the clock signal; first means coupled to the first and second sources to compare the phase relationship of the bits of the code and clock signals; second means coupled to the first means to produce a first pulse signal of one polarity having a first width variation dependent on the phase relationship of the bits of the code and clock signals; third means coupled to the first means to produce a second pulse signal of a polarity opposite the one polarity having a second width variation dependent on the phase relationship of the bits of the code and clock signals opposite the first width variation; and fourth means coupled to the second and third means and the second source responsive to the first and second pulse signals to produce a control signal for application to the second source to adjust the phase of the bits of the clock signal to establish and maintain synchronism between the bits of the code and clock signals.

BRIEF DESCRIPTION OF THE DRAWING

The above-mentioned and other features and objects of this invention will become more apparent by reference to the following description taken in conjunction with the accompanying drawing, in which.

DESCRIPTION OF THE PREFERRED EMBODIMENTS

Figure 1:
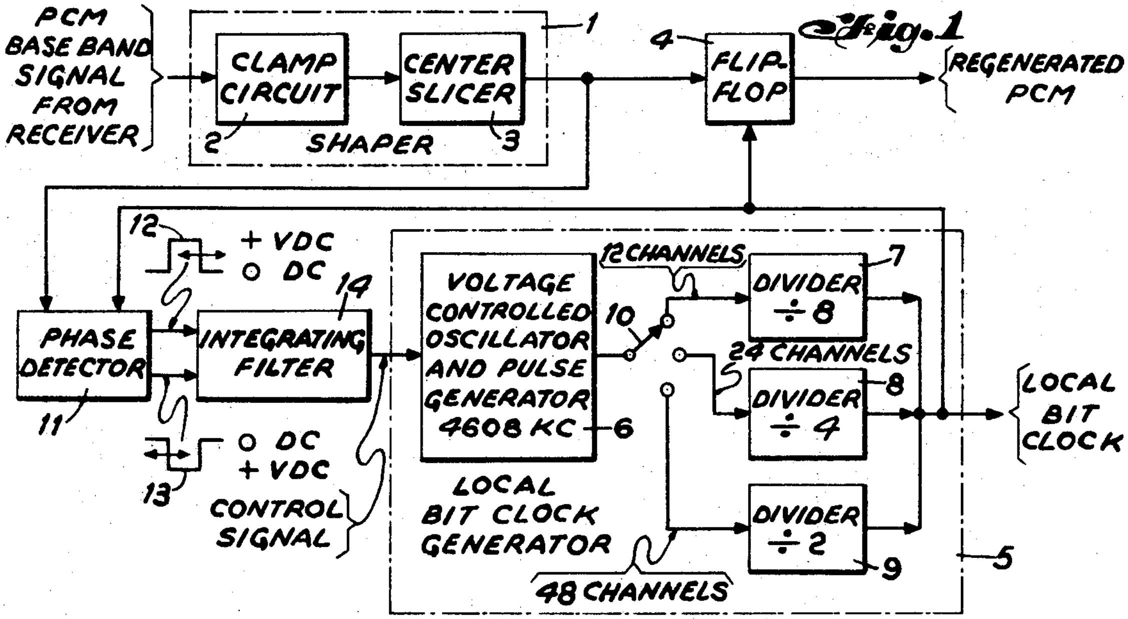
FIG. 1 is a block diagram of the synchronization system in accordance with the principles of this invention.
Figure 3:
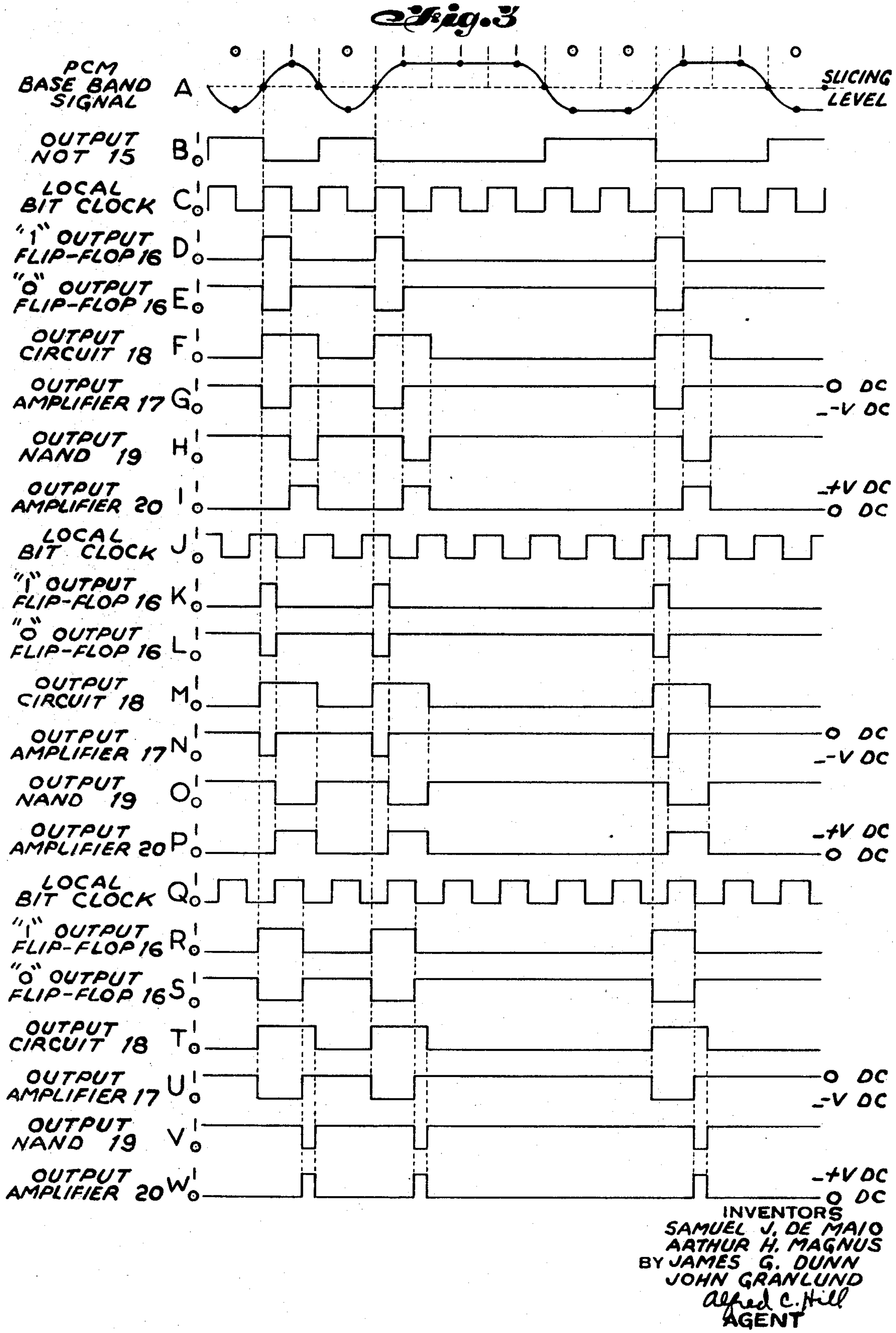
FIG. 3 is a timing diagram illustrating the operation of the phase detector of FIG. 2.

Referring to FIG. 1, there is illustrated therein a block diagram of the synchronizing system of the present invention incorporating therein the novel combined phase detector and integrating circuit for providing the desired control signal to assure that the local bit clock is in synchronism with the bits of the received PCM signal. The distorted PCM baseband signal, such as illustrated in Curve A, FIG. 3 is applied to shaper 1 to amplitude regenerate the distorted PCM signal, that is, to render the PCM baseband signal with positive and negative going transitions which are substantially vertical rather than sloped as in the distorted PCM baseband signal. Shaper 1, for example, may include clamp circuit 2 and center slicer 3. The reshaped PCM signal at the output of shaper 1 is then coupled to flip-flop 4 for time regeneration under control of the locally generated bit clock. The output of flip-flop 4 is regenerated PCM properly timed provided the local bit clock is in synchronism with the bits of the received PCM baseband signal.

The local bit clock generator 5 may, for example, include voltage controlled oscillator (VCO) and pulse generator 6 having, for example, an operating frequency of 4608 kc. (kilocycles ) which is fed to an appropriate one of frequency dividers 7, 8 and 9 as selected by switch 10 to adjust the frequency of the local bit clock for different channel capacities of the received PCM baseband signal. The local bit clock is synchronized to the bits of the PCM signal by applying the output of shaper 1 and the output of generator 5 to phase detector 11 which is digital in nature as will be hereinbelow described with reference to FIGS. 2 and 5. As illustrated detector 11 produces a positive pulse 12 whose leading edge is varied in time to produce a width modulated pulse proportional to the phase relationship between the bit clock and the bits of the PCM signal. In addition, detector 11 produces a negative pulse 13 having its trailing edge varied in time to produce a width modulated pulse whose width is proportional to the phase relationship of the PCM signal and the bit clock. As will be observed the width modulated pulses 12 and 13 of opposite polarity have their widths varied in opposite directions. For instance, if pulse 12 increases in width pulse 13 will decrease in width. Pulses 12 and 13 are coupled to integrating filter 14 which algebraically combines these two pulses to produce a control signal which is proportional to the phase relationship between the bits of the PCM signal and the local bit clock for application to VCO 6 to bring about the adjustment of the local bit clock for synchronization with the bits of the PCM input signal.

The integrating filter 14 plays an important function in the phase locked loop synchronization system since it has appropriate time constants therein to maintain the correct local clock time during periods of no signal coupled to shaper 1 caused by fading in tropospheric scatter or other types of propagation medium.

Figures 2, 4:
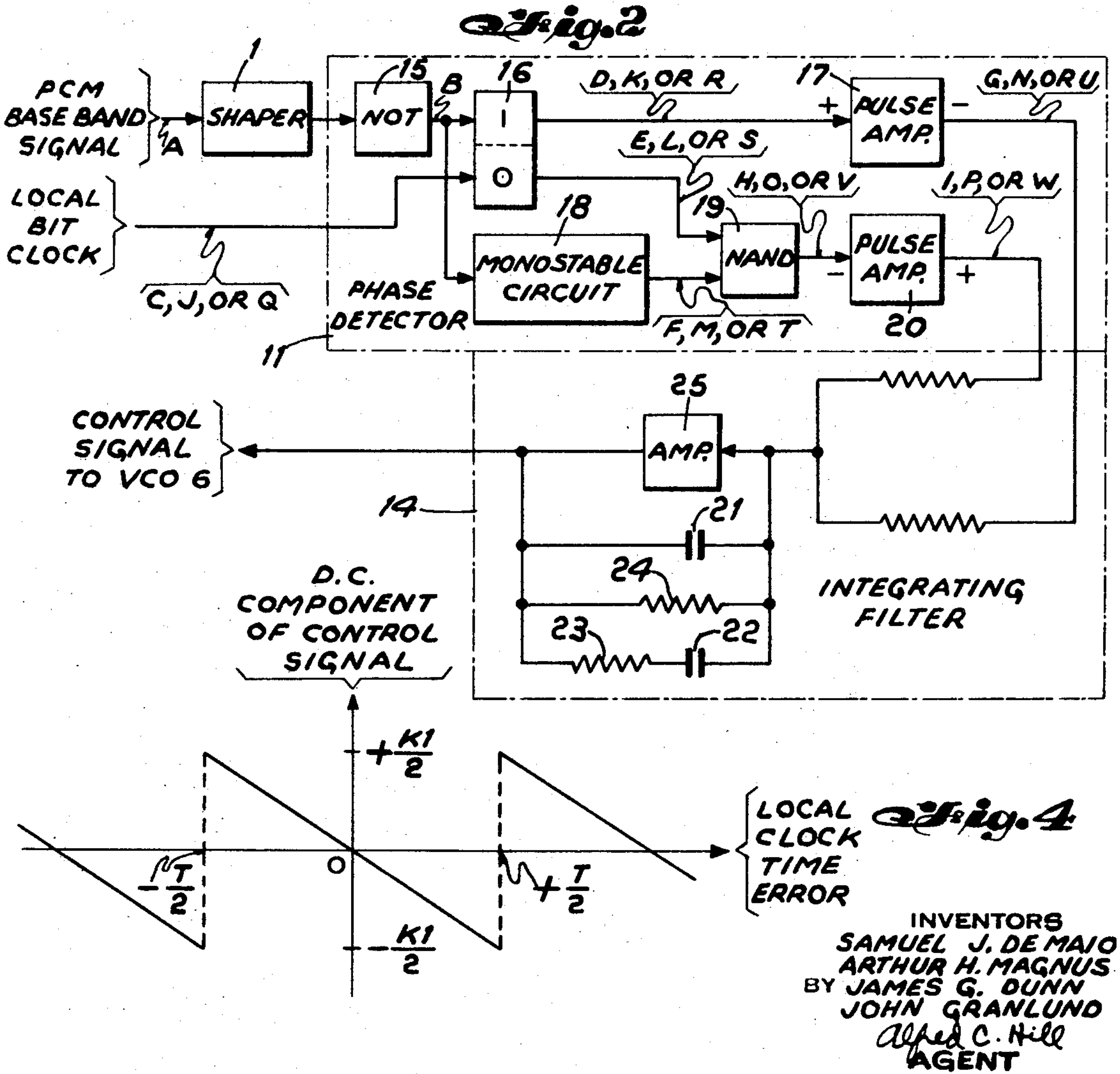
FIG. 2 is a block diagram of one embodiment of the phase detector and integrating filter of the system of FIG. 1.
FIG. 4 is a curve illustrating the effective DC component output versus local clock time error of the phase detector of this invention.

Referring to FIG. 2, there is illustrated therein one embodiment of phase detector 11 and integrating filter 14 of the system of FIG. 1. The distorted PCM baseband signal, Curve A, FIG. 3, is applied to shaper 1 and then in NOT circuit 15 producing the reshaped and inverted PCM baseband signal, Curve B, FIG. 3. It should be noted that the letter references in FIG. 2 correspond to the letters of the Curves of FIG. 3. The output of NOT 15 is coupled to the "1" input of flip-flop 16 which has applied to its "0" input the local bit clock, Curve C, FIG. 3. Flip-Flop 16 operates to compare the phase relationship between the local bit clock and the reshaped and inverted PCM base signal, in other words, the signals of Curves B and C, FIG. 3.

Let us consider first the condition of synchronization between the bit clock and the received PCM baseband signal. This condition occurs when the negative transition of the bit clock occurs exactly in the center of the bit of the received signal. On a negative transition of Curve B, FIG. 3 flip-flop 16 is triggered to its "1" condition, Curve D, FIG. 3. When the negative transition of the bit clock, Curve C, FIG. 3, occurs flip-flop 16 is returned to its "0" condition. The resultant pulse of Curve D, FIG. 3 is coupled to pulse amplifier 17 which amplifies and inverts the "1" output of flip-flop 16, Curve G, FIG. 3. The output of NOT 15 is coupled to a monostable circuit 17 wherein the negative transition of the signal of Curve B, FIG. 3 sets circuit 18 in its "1" condition which then normally resets to its "O" condition after a period of time at least as long as the bit time of the input PCM signal. The output of circuit 18, Curve F, FIG. 3, is coupled to NAND circuit 19 which has its other input coupled to the "O" output of flip-flop 16. The output of NAND 19 is a negative pulse extending from the negative transition of the bit clock to the time when circuit 18 returns to its "O" state. The output of NAND 19 is then coupled to pulse amplifier 20 wherein it is amplified and inverted to produce a positive signal, Curve I, FIG. 3. In the assumed state of synchronization the area under the negative pulses of Curve G, FIG. 3 and the positive pulses of curve I, FIG. 3 are equal. Thus, when they are applied to integrating filter 14 there will be no DC component present due to the algebraic summation of the two outputs of phase detector 11.

Let us assume now that the bit clock lags the PCM input. The operation of phase detector 11 is illustrated by observing Curves B and J through P, FIG. 3. In this condition of phase displacement the negative transition of the bit clock occurs in the first half of a bit of the PCM signal at the output of NOT 15. As before the flip-flop is set into its "1" condition by the negative transition of the output of NOT 15 and resets to its "0" condition by the negative transition of the bit clock which results in a pulse width as illustrated in Curve K, FIG. 3. Also the negative transition of the output of NOT 15 sets circuit 18 into its "1" condition, Curve M, FIG. 3. The output of circuit 18 and the "0" output of flip-flop 16 are coupled to NAND 19 which produces a pulse as indicated in Curve 0, FIG. 3. Amplifier 17 inverts the pulses of Curve K, FIG. 3 to produce the negative pulses of Curve N, FIG. 3. The output or NAND 19, Curve O, FIG. 3, is inverted by amplifier 20 to produce the positive pulses of Curve P, FIG. 3. It is obvious as can be seen from the pulses of Curve N, FIG. 3 and the pulses or Curve P, FIG. 3 that the area under these two pulses are different from one another and, thus, there will result a positive DC component which would be produced in integrating filter 14 for coupling to VCO 6 for bit synchronization.

The operation of phase detector 11, which is the same as described above, is illustrated in Curves B and Q through W, FIG. 3 when the clock bit leads the received PCM bits. A comparison of Curve U with Curve W, FIG. 3 illustrates that the negative pulse of Curve U has much more area thereunder than the positive pulse of Curve W thereby resulting in the output of integrator 14 a negative DC component to control VCO 6.

Referring to FIG. 4, there is illustrated therein that the effective DC component of the control signal at the output of detector 11 and the actual DC control voltage at the output of integrating filter 14 is proportional to the phase error of the PCM input signal and the bit clock. The DC component of the integrating filter output depends on both the phase error and the average number of data transitions per bit. Since a long time constant integrating filter will be used in conjunction with the phase detector output variations in phase detector gain due to variations the data pattern will be averaged out. It will be assumed that average of one data transition will occur every two bit periods.

Integrating filter 14 of FIG. 2 is used to algebraically sum the digital or pulse width outputs of amplifiers 17 and 20 to derive the control signal for coupling to VCO 6. When large DC component inputs are presented to integrating filter 14 capacitor 21 performs an integration of relatively short time constant as provided by amplifier 25 and resistor 24 to provide rapid correction or synchronization. After a long time period of normal operation, capacitor 22, where capacitor 22 is much greater than capacitor 21, is charged to the same voltage as capacitor 21. Once this condition is reached, should the input signals disappear during a fade, the long time constant of capacitor C-2 provided by resistor 23 and amplifier tends to maintain the output or control voltage. Upon the return of input signal, capacitor 21 will again allow rapid correction or synchronization. Thus, this type of integrator has a fast attack, slow release transfer characteristic. Because the time constant of capacitor 21, although relatively short with respect to the period of radio fades, is very long with respect to the clock period, this configuration may be considered to approximate an ideal integrator. Use of a nearly ideal integrating circuit has the advantage of extending the pull-in range of the phase locked loop. In fact, for a perfect integrator, the pull-in range is limited only by the control range of the voltage controlled oscillator.

Figure 5:
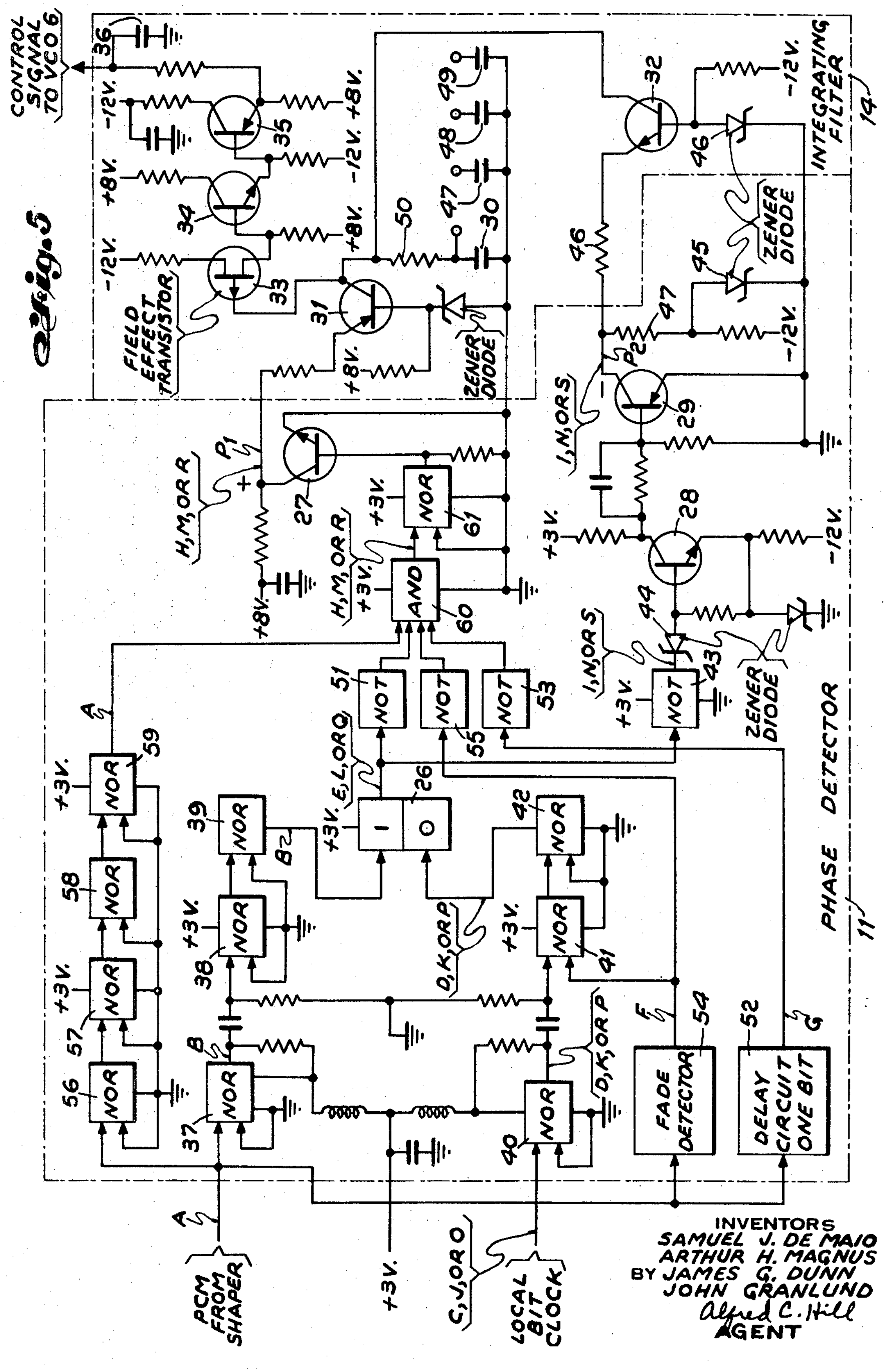
FIG. 5 is a block diagram, partially schematic, of another embodiment of the phase detector and integrating filter of the system of FIG. 1.
Figure 6:
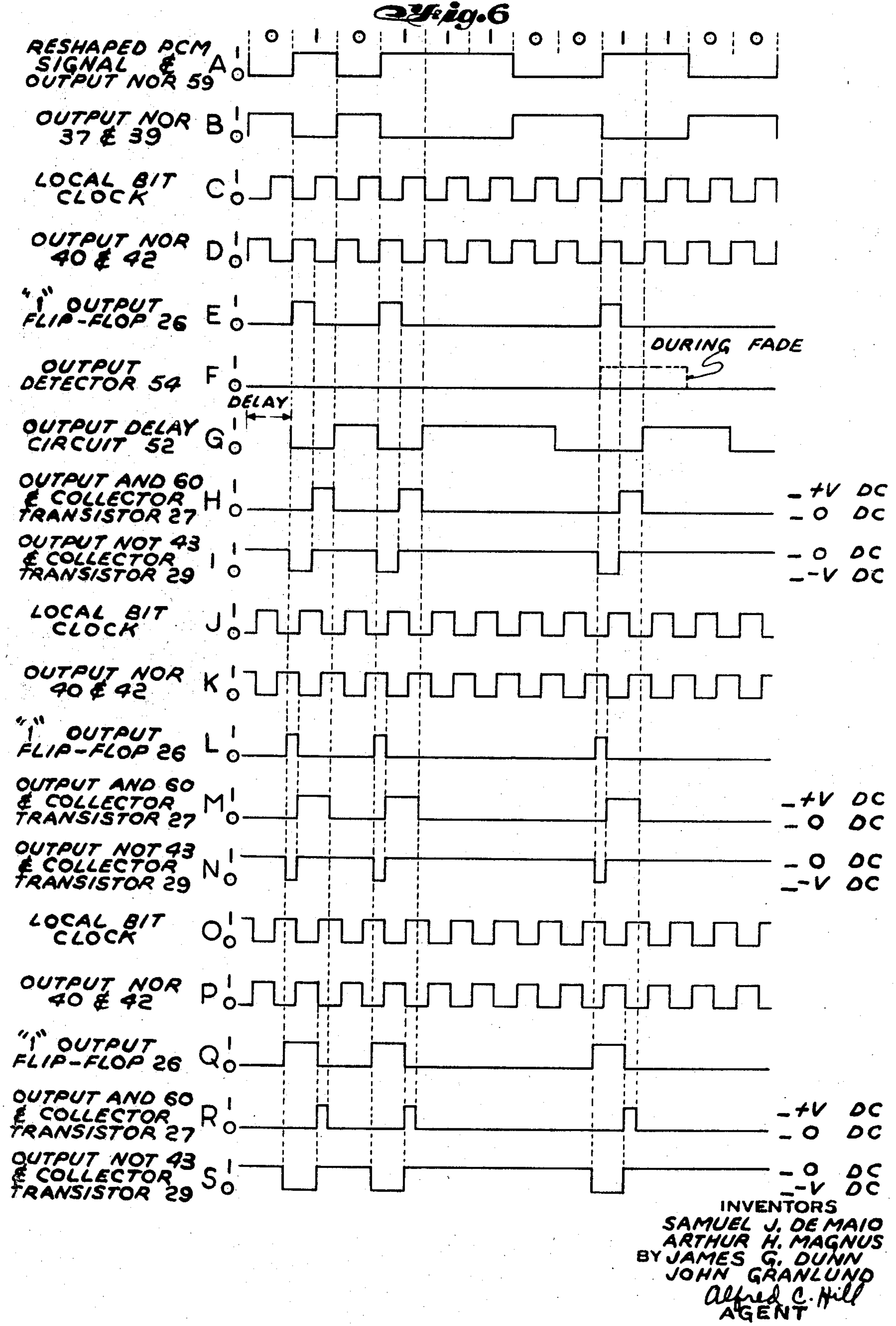
FIG. 6 is a timing diagram illustrating the operation of the phase detector of FIG. 5.

Referring to FIG. 5, there is illustrated another embodiment of phase detector 11 and integrating filter 14 that can be employed in the system of FIG. 1. As in the case of FIG. 2 the curves of the timing diagram of FIG. 6 are indicated where they occur in the circuit of FIG. 5 by the corresponding letter reference.

It should be noted that there are a number of one input NOR circuits employed in phase detector 11. This connection of the NOR circuits operates like an inverter or NOT circuit. However, the NOR circuit representation is maintained since in the actual manufacturing of the complete system in which phase detector 11 and the system of FIG. 1 is employed enables the manufacturing of identical circuits for other portions of the complete receiving system which will cut the cost of manufacturing the systems enabling the proper connection to the circuits to provide either the NOR operation or the NOT operation.

In general due to signal fading characteristics encountered with tropospheric propogation, it is necessary that the local clock extraction must sustain oscillation for periods of time much greater than for line of sight operation. Since it is difficult to sustain oscillation much beyond several milliseconds with a ringing filter approach (because of limited Q) it is necessary to obtain a higher Q method of extraction. With tropospheric propagation, fades can last up to seconds. The phase locked loop oscillator is a high Q oscillator that is capable of locking to the data bit frequency. A high stability oscillator ($1\times10^{-8}$) is continuously corrected by a control voltage generated by the incoming data bit transitions. Providing noise transitions do not change the DC control signal, when signal data is removed, the oscillator will tend to remain at the frequency it achieved before the data was removed.

Basically, the developed synchronizing system consists of a voltage controlled oscillator which has the capability of changing frequency when supplied by a modulating DC signal from integrator 14. When a ± 5 volt control signal is applied to the modulation input, the oscillator will change frequency ± 10 cycles. The output signal is a square wave having an appropriate frequency that conforms to the system logic levels.

A digital comparator in the form of flip-flop 26 compares the clock transitions with the data bit transitions and generates two signals P1 and P2 which contain the phase difference information between the data transitions and the bit clock. The object is to position the triggering edge of the clock in the middle of the reshaped data. When both the signals are at this desired phase, the desired phase error is zero (equal width), and the two signals have equal weight. If the data and clock are slipped in frequency, the P1 and P2 pulses will have different weight (width) depending on whether the clock signal is leading or lagging the phase of the data transitions.

Transistor 27 provides the positive pulse signal P1 at its collector output and transistors 28 and 29 cooperate to provide the negative pulse output P2 at the collector output of transistor 29. The oppositely polarized pulses act to charge and discharge capacitor 30 by means of constant current generators including transistors 31 and 32. The resultant voltage on capacitor 30 is the control voltage for the VCO 6. Transistors 33, 34 and 35 provide buffering and apply the control voltage for application to VCO 6 to capacitor 36 and, hence, to the modulation input of VCO 6 to adjust the frequency and, hence, the phase thereof for a short of time in the appropriate direction to establish synchronization. It is necessary that capacitor 30 does not discharge when correction signals are not present (in the presence of a fade of the code signal input). Therefore, a high time constant is required when data is absent. The field effect transistor 33 has the function of providing a high impedance load for capacitor 30 and, thus, the required high time constant to hold the value of the control signal that was present just prior to the fade period.

Phase detector 11 and integrating filter 14 of FIG. 5 will now be described in greater detail with respect to the timing diagram of FIG. 6. The reshaped PCM signal from shaper 1 is coupled to NOR 37 which converts negative data transitions or negative pulses to a positive pulse for setting flip-flop 26 in its "1" condition upon occurrence of a negative transition therein. The reshaped PCM signal is shown in Curve A, FIG. 6 and the output of NOR 37 which is the same as the output from NOR 39 is illustrated in Curve B, FIG. 6. NOR circuits 38 and 39 are employed for buffering. Thus, when the output of NOR 39 goes negative, flip-flop 26 is set into its "1" state. The local bit clock is coupled to NOR 40 having the wave shape of Curve C, FIG. 6. NOR 40 inverts the local bit clock and is applied through buffering NOR circuits 41 and 42 to the "0" input of flip-flop 26 to reset flip-flop 26 when a negative transition of the output of NOR 42 is present. See Curve D, FIG. 6.

Let us assume for purposes of illustrating the operation of the system of FIG. 5 that the system is locked and the negative transition of the clock falls in the middle of the data bit. Therefore, flip-flop 26 produces a "1" output at the start of a negative data transition of Curve B, FIG. 6 and is reset by the negative transition of the clock of Curve C, FIG. 6 after half of a baud (bit) time resulting in the pulse signal of Curve E, FIG. 6. The pulses of Curve E, FIG. 6 are applied to NOT circuit 43 for inversion. The Zener diode 44 and transistors 28 and 29 translate a 0 to +3 volt pulse to 0 to −8.2 volt pulse at the collector of transistor 29. A constant current generator including transistor 32 turns on when transistor 28 is off (−8.2 volts) and a constant current of 1.5 milliamps discharges capacitor 30. Zener diodes 45 and 46 along with resistors 45 and 46 are selected to provide a 1 milliamp of current. The effective time constant of this control voltage circuit can be made longer by increasing the capacity of capacitor 30 or decreasing the constant current value since $(C)\ (dE) \cong (i)\ (DT)$, where $C$ represents the capacity of capacitor 30, $dE$ equals the voltage increase, $i$ equals the current and $DT$ equals the discharge time. To accommodate variable time constants, capacitors 47, 48 and 49 are provided for paralleling with capacitor 30. Resistor 50 in conjunction with capacitor 36 provides for a short time constant circuit for making corrections to the VCO 6 as opposed to the time constant present when no corrections are being made. Curve I, FIG. 6 illustrates the output of NOT 43 and the collector of transistor 29 which controls the duration of conduction of the constant current generator including transistor 32.

In the above sequence of operating steps the negative correction pulse (Curve I, FIG. 6) was traced to the output. To trace the positive correction pulse, it is necessary to backtrack to flip-flop 26. When flip-flop 26 is set to the "0" condition by the output of NOR 42 a "0" output will be applied to NOT circuit 51. A one baud or bit delayed replica of the input from shaper 1 is produced at the output of delay circuit 52 and is illustrated in Curve G, FIG. 6. The output of circuit 52 is coupled to NOT circuit 53. Fade detector 54 is also coupled to the input from shaper 1 and provides a "0" output as long as the signal is above a predetermined amplitude level indicating no loss of code signal. The output of this circuit is illustrated Curve F, FIG. 6 and is coupled to NOT circuit 55. NOR circuits 56, 57, 58 and 59 are coupled in tandem to each other and to the input from shaper 1 with the output of NOR being coupled to AND circuit 60. The purpose of these four NOR circuits is to provide the fine delay adjustments of the reshaped PCM input gated at AND gate 60. These NOR gates are used to make up for the delay of the PCM signal going through NOR circuits 37, 38, 39 and flip-flop 26 to minimize spikes at the output of AND circuit 60. The output of NOT circuits 51, 53 and 55 provides the other inputs for AND gate 60 which provides an output a indicated in Curve H, FIG. 6. This output is applied to NOR circuit 61 and, hence, to transistor 27 which produces at its collector output the positive pulse of Curve H, FIG. 6. Transistor 27 converts a 0 to +3 volt pulse to a 0 to +7 volt pulse at the collector of transistor 27. The circuitry of constant current generator including transistor 31 is identical to the constant current generator including transistor 32 except that transistor 31 is a PNP transistor and, therefore, the charge current is the same 1 milliamp current. Since the initial condition was that the data transitions and clock were locked in frequency and phase, the currents through transistors 31 and 32 must be equal in order that no charge is present on the capacitor. Actually, these two currents do not occur simultaneously as illustrated in Curves H and I, FIG. 6. However, the net charge is zero since the capacitor always charges in a negative direction and then in the positive direction. As pointed out hereinabove transistors 33, 34 and 35 provides the high impedance buffering and the long time constant required to keep the DC control voltage from changing when the pulse correction signals are not present due to the lack of PCM signal due to a fade. A provision has been made to keep the current generators including transistors 31 and 32 off when long fades are encountered. This is accomplished by providing fade detector 54 in a configuration that will produce a "1" output as indicated in the dotted line portion of Curve F, FIG. 6. This results in a "0"

input to AND gate 60 which renders this AND gate nonconductive and also through NOR circuit 41 which resets flip-flop 26 to its "0" condition. Therefore, capacitor 30 which may include parallel capacitors 47, 48 or 49 will remain charged with a time constant determined by the leakage through the high impedance path of transistors 33, 34 and 35. This in turn will hold the frequency and, hence, the phase from changing until the signal strength is improved and new pulse correction signals are obtained.

When the local bit clock lags the received PCM system, the operation of the system is illustrated by reference to Curves B, F, G and J, through N. By comparing the resultant width modulated pulses of Curves M and N, FIG. 6, it is observed that there will be a positive control voltage at the control input to VCO 6.

Similarly, when the local bit clock leads the received PCM, the circuit operates as illustrated by Curves B, F, G and O through S. Again comparison of the pulses of Curves R and S, FIG. 3 illustrates the different value thereof and that there will be a negative DC control voltage to control the VCO 6.

While we have described above the principles of our invention in connection with specific apparatus, it is to be clearly understood that this description is made only by way of example and not as a limitation to the scope of our invention as set forth in the objects thereof and in the accompanying claims.

We claim:

1. A system to generate an output signal proportional to the phase relationship of a first pulse signal and a second pulse signal comprising:
- a first source of said first pulse signal;
- a second source of said second pulse signal;
- first means coupled to said first and second sources to compare the phase relationship of said first and second pulse signals;
- second means coupled to said first means to produce a third pulse signal of one polarity having a first width variation dependent on the phase relationship of said first and second pulse signals;
- third means coupled to said first means to produce a fourth pulse signal of a polarity opposite to said one polarity having a second width variation dependent on the phase relationship of said first and second signals opposite said first width variation; and
- fourth means coupled to said second and third means responsive to said third and fourth pulse signals to provide said output signal;
- said first means including: inverting means coupled to said first source, and a flip-flop having its "1" input coupled to said inverting means and its "0" input coupled to said second source;
- said second means including: first amplifier means coupled to the "1" output of said flip-flop to produce said third signal;
- said third means including: monostable means coupled to said inverting means, logic circuit means coupled to the "0" output of said flip-flop and said monostable means, and second amplifier means coupled to said logic circuit means to produce said fourth signal; and
- said fourth means including: integrating means coupled to said first and second amplifier means to provide said output signal in response to the duration of said third and fourth signals.

2. A system to generate an output signal proportional to the phase relationship of a first pulse signal and a second pulse signal comprising:
- a first source of said first pulse signal;
- a second source of said second pulse signal;
- first means coupled to said first and second sources to compare the phase relationship of said first and second pulse signals;
- second means coupled to said first means to produce a third pulse signal of one polarity having a first width variation dependent on the phase relationship of said first and second pulse signals;

- third means coupled to said first means to produce a fourth pulse signal of a polarity opposite to said one polarity having a second width variation dependent on the phase relationship of said first and second signals opposite said first width variation; and
- fourth means coupled to said second and third means responsive to said third and fourth pulse signals to provide said output signal;
- said first means including:
  - first inverting means coupled to said first source;
  - second inverting means coupled to said second source; and
  - a flip-flop having its "1" input coupled to said first inverting means and its "0" input coupled to said second inverting means;
- said second means including:
  - first logic circuit means coupled to the "1" output of said flip-flop; and
  - first amplifier means coupled to said first logic circuit means to produce said third signal;
- said third means including:
  - second logic circuit means coupled to the "1" output of said flip-flop and said first source; and
  - second amplifier means coupled to said second logic circuit means to produce said fourth signal; and
- said fourth means including:
  - integrating means having capacitive means to provide said output signal;
  - a first constant current source coupled to said capacitive means and the appropriate one of said first and second amplifier means responsive to the duration of the associated one of said third and fourth signals to control the conduction of said first current source to charge said capacitive means; and
  - a second constant current source coupled to said capacitive means and the other of said first and second amplifier means responsive to the duration of the associated one of said third and fourth signals to control the conduction of said second current source to discharge of said capacitive means.

3. A system to synchronize a local bit clock signal to received bits of a binary code signal comprising:
- a first source of said code signal;
- a second source of said clock signal;
- first means coupled to said first and second sources to compare the phase relationship of the bits of said code and clock signals;
- second means coupled to said first means to produce a first pulse signal of one polarity having a first width variation dependent on the phase relationship of the bits of said code and clock signals;
- third means coupled to said first means to produce a second pulse signal of a polarity opposite said one polarity having a second width variation dependent on the phase relationship of the bits of said code and clock signals opposite said first width variation; and
- fourth A system according to said second and third means and said second source responsive to said first and second pulse signals to produce a control signal for input to said second source to adjust the phase of the bits of said clock signal to establish and maintain synchronism between the bits of said code and clock signals;
- said fourth means including:
  - an integrating means coupled to said second and third means and said second source having:
  - fifth means to enable rapid production of said control signal to establish synchronism; and
  - sixth means to maintain the value of said control signal when the amplitude of said code signal decreases to a value below a given amplitude level.

4. A system according to claim 3, wherein said sixth means includes a field effect transistor.

5. A system according to claim 3, wherein said first means includes bistable means having two inputs, one input being coupled to said first source and the other input being coupled to said second source.

6. A system to synchronize a local bit clock signal to received bits of a binary code signal comprising:

a first source of said code signal;

a second source of said clock signal;

first means coupled to said first and second sources to compare the phase relationship of the bits of said code and clock signals;

second means coupled to said first means to produce a first pulse signal of one polarity having a first width variation dependent on the phase relationship of the bits of said code and clock signals;

third means coupled to said first means to produce a second pulse signal of a polarity opposite said one polarity having a second width variation dependent on the phase relationship of the bits of said code and clock signals opposite said first width variation; and fourth means coupled to said second and third means and said second source responsive to said first and second pulse signals to produce a control signal for application to said second source to adjust the phase of the bits of said clock signal to establish and maintain synchronism between the bits of said code and clock signals;

said first means including:

inverting means coupled to said first source; and a flip-flop having its "1" input coupled to said inverting means and its "0" input coupled to said second source;

said second means including:

first amplifier means coupled to the "1" output of said flip-flop to produce said first pulse signals;

said third means including:

monostable means coupled to said inverting means;

logic circuit means coupled to the "0" output of said flip-flop and said monostable means; and second amplifier means coupled to said logic circuit means to produce said second pulse signal; and said fourth means including:

integrating means coupled to said first and second amplifier means to provide said control signal in response to the duration of said first and second pulse signals.

7. A system to synchronize a local bit clock signal to receive bits of a binary code signal comprising:

a first source of said code signal;

a second source of said clock signal;

first means coupled to said first and second sources to compare the phase relationship of the bits of said code and clock signals;

second means coupled to said first means to produce a first pulse signal of one polarity having a first width variation dependent on the phase relationship of the bits of said code and clock signals;

third means coupled to said first means to produce a second pulse signal of a polarity opposite said one polarity having a second width variation dependent on the phase relationship of the bits of said code and clock signals opposite said first width variation; and fourth means coupled to said second and third means and said second source responsive to said first and second pulse signals to produce a control signal for application to said second source to adjust the phase of the bits of said clock signal to establish and maintain synchronism between the bits of said code and clock signals;

said first means including:

first inverting means coupled to said first source;

second inverting means coupled to said second source; and a flip-flop having its "1" input coupled to said first inverting means and its "0" input coupled to said second inverting means;

said second means including:

first logic circuit means coupled to the "1" output of said flip-flop; and first amplifier means coupled to said first logic circuit means to produce said first pulse signal;

said third means including:

second logic circuit means coupled to the "1" output of said flip-flop and said first source; and second amplifier means coupled to said second logic circuit means to produce said second pulse signal; and said fourth means including:

integrating means having capacitive means to provide said control signal;

a first constant current source coupled to said capacitive means and the appropriate one of said first and second amplifier means responsive to the duration of the associated one of said first and second pulse signals to control the conduction of said first current source to charge said capacitive means; and a second constant source coupled to said capacitive means and the other of said first and second amplifier means responsive to the duration of the associated one of said first and second pulse signals to control the conduction of said second current source to discharge said capacitive means.

UNITED STATES PATENT OFFICE
CERTIFICATE OF CORRECTION

Patent No. 3,566,155 Dated February 23, 1971

Inventor(s) Samuel J. DeMaio, Arthur H. Magnus, James G. Dunn, John Gr

It is certified that error appears in the above-identified paten and that said Letters Patent are hereby corrected as shown below:

Column 8, line 58, cancel "A system according" and insert --means coupled --; and Column 8, line 60, cancel "input" and insert --applicatio Signed and sealed this 7th day of September 1971.

(SEAL)
Attest:

EDWARD M.FLETCHER,JR.
Attesting Officer

ROBERT GOTTSCHALK
Acting Commissioner of Pate